(12) United States Patent
Yu et al.

(10) Patent No.: US 7,085,596 B2
(45) Date of Patent: Aug. 1, 2006

(54) PORTABLE COMMUNICATION APPARATUS

(75) Inventors: Kai-Cheng Yu, Sanchung (TW); Jiung-Cheng Pan, Tainan (TW)

(73) Assignee: BENQ Corporation, Taoyuan (TW)

( * ) Notice: Subject to any disclaimer, the term of this patent is extended or adjusted under 35 U.S.C. 154(b) by 535 days.

(21) Appl. No.: 10/403,464

(22) Filed: Mar. 31, 2003

(65) Prior Publication Data

US 2004/0203533 A1    Oct. 14, 2004

(30) Foreign Application Priority Data

Jun. 24, 2002    (TW) .............................. 91209453 U

(51) Int. Cl.
*H04M 1/00*    (2006.01)

(52) U.S. Cl. ............... 455/575.1; 455/66.1; 455/575.7; 379/433.12; 379/433.13; 379/433.04; 379/433.07

(58) Field of Classification Search ............... 455/66.1, 455/575.1, 575.7; 379/446, 454, 455, 469, 379/433.12, 433.13
See application file for complete search history.

(56) References Cited

U.S. PATENT DOCUMENTS

| | | | | |
|---|---|---|---|---|
| 6,125,289 A | * | 9/2000 | Lee .......................... | 455/575.3 |
| 6,466,667 B1 | * | 10/2002 | Kaschke ................ | 379/433.13 |
| 6,542,721 B1 | * | 4/2003 | Boesen ..................... | 455/553.1 |
| 6,812,954 B1 | * | 11/2004 | Priestman et al. ........ | 348/14.01 |
| 2002/0077123 A1 | * | 6/2002 | Otsuka et al. .............. | 455/456 |
| 2002/0077145 A1 | * | 6/2002 | Kamiya et al. ............. | 455/550 |
| 2003/0036365 A1 | * | 2/2003 | Kuroda ........................ | 455/90 |

* cited by examiner

*Primary Examiner*—Matthew Anderson
*Assistant Examiner*—Sanh Phu
(74) *Attorney, Agent, or Firm*—Snell & Wilmer LLP

(57) ABSTRACT

The present invention relates to a portable communication apparatus, including a body, a first portion and a second portion. The body has a first end and a second end. The first portion is pivotally connected to the first end and the second portion is pivotally connected to the second end. The body further has a surface. The first portion covers a portion of the surface while the first potion is in a first position. The second portion covers a portion of the surface while the second potion is in a second position. The body has a display apparatus. The first portion has a receiver. The second portion has a plurality of keypads.

21 Claims, 7 Drawing Sheets

PORTABLE COMMUNICATION APPARATUS

CROSS REFERENCE TO RELATED APPLICATIONS

This application claims priority of Taiwan Patent Application Ser. No. 091209453 filed on Jun. 24, 2002.

FIELD OF INVENTION

The present invention relates to a portable communication apparatus, and more particularly, to a foldable portable communication apparatus.

BACKGROUND OF THE INVENTION

While the number of users of portable computers increases in recent years, the market of mobile phones expands rapidly as well. The appearance and the functionality of mobile phone are two important features making mobile phone so popular.

The current trend for the mobile phone is to maximize its screen. This type of product is known as "foldable mobile phone." As shown in FIG. 1, the conventional foldable mobile phone includes a body 1 and a cover 2. Body 1 connects with cover 2 by using a hinge 3. Body 1 has a plurality of keypads 4 and a microphone 5. A screen 6 and a receiver 7 are disposed in the space provided in the cover 2.

While being disposed in the cover 2, the receiver 7 limits the size of screen 6 of the foldable mobile phone. Generally, a mobile phone having maximal screen size under a same cover area is desired.

SUMMARY OF THE INVENTION

The present invention provides a portable communication apparatus. The present invention includes a body, a first portion, and a second portion. The display apparatus of the present invention is disposed in the body. The receiver and the keypads are disposed in the first portion and the second portion. Because the use of components such as receiver and keypads do not limit the size of display apparatus, the portable communication apparatus has maximal display apparatus size.

The body has a first end and a second end. The first portion pivotally connects to the first end and the second portion pivotally connects to the second end. The body further has a surface. The surface has a first section and a second section. The first portion covers the first section while the first portion is in a first position. The second portion covers the second section while the second portion is in a second position.

The body has a display apparatus, a microphone and an input apparatus. The first portion has a receiver, a CCD (charge couple device) video and a speaker. The second portion has a keypad.

DETAILED DESCRIPTION

The present invention provides a portable communication apparatus, including a body, a first portion, and a second portion. In the preferred embodiment, the portable communication apparatus is a mobile phone. An optionally added function may include, for example, a digital camera.

Figure 1:
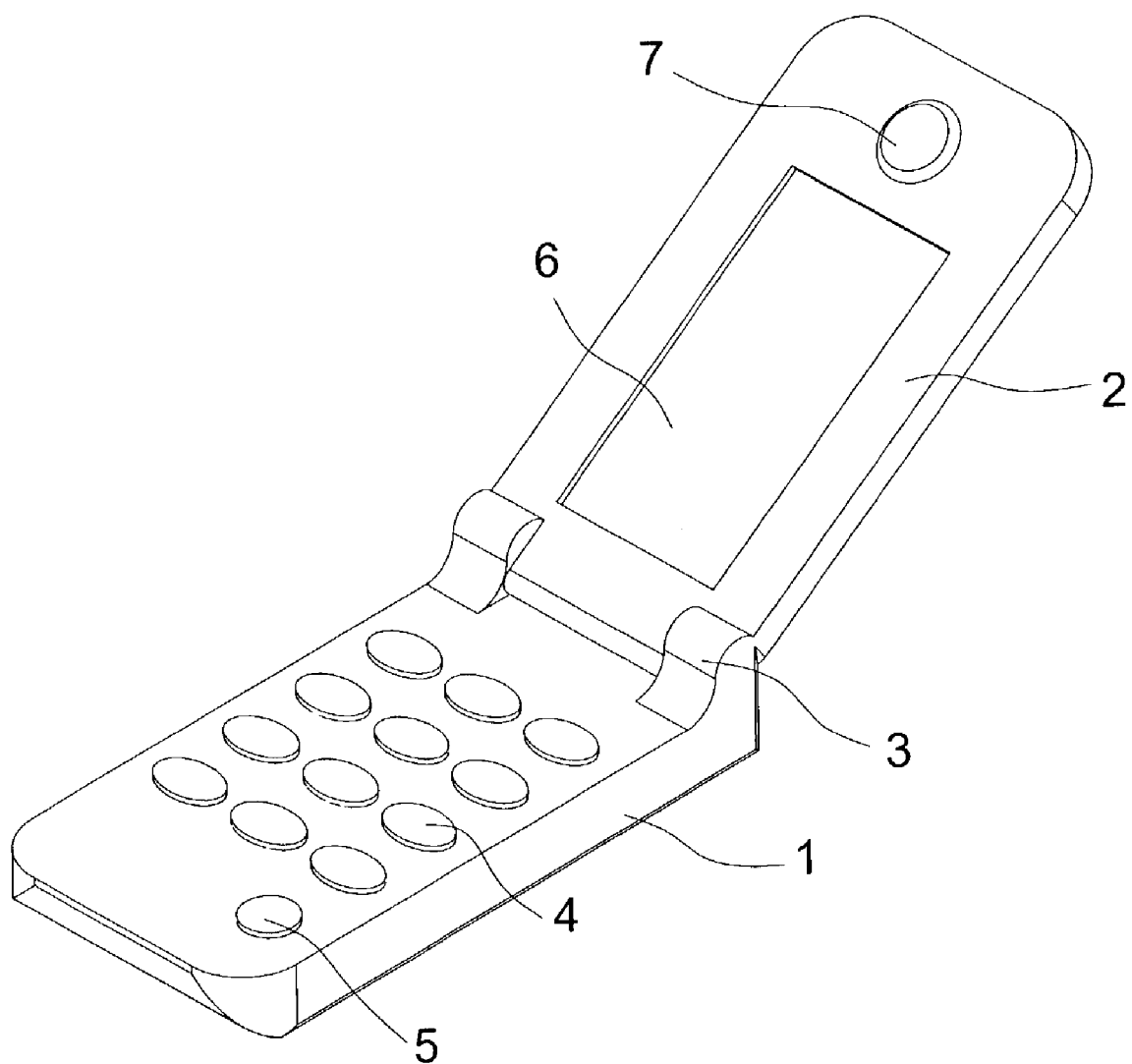
FIG. 1 shows a conventional portable communication apparatus.
Figure 2A:
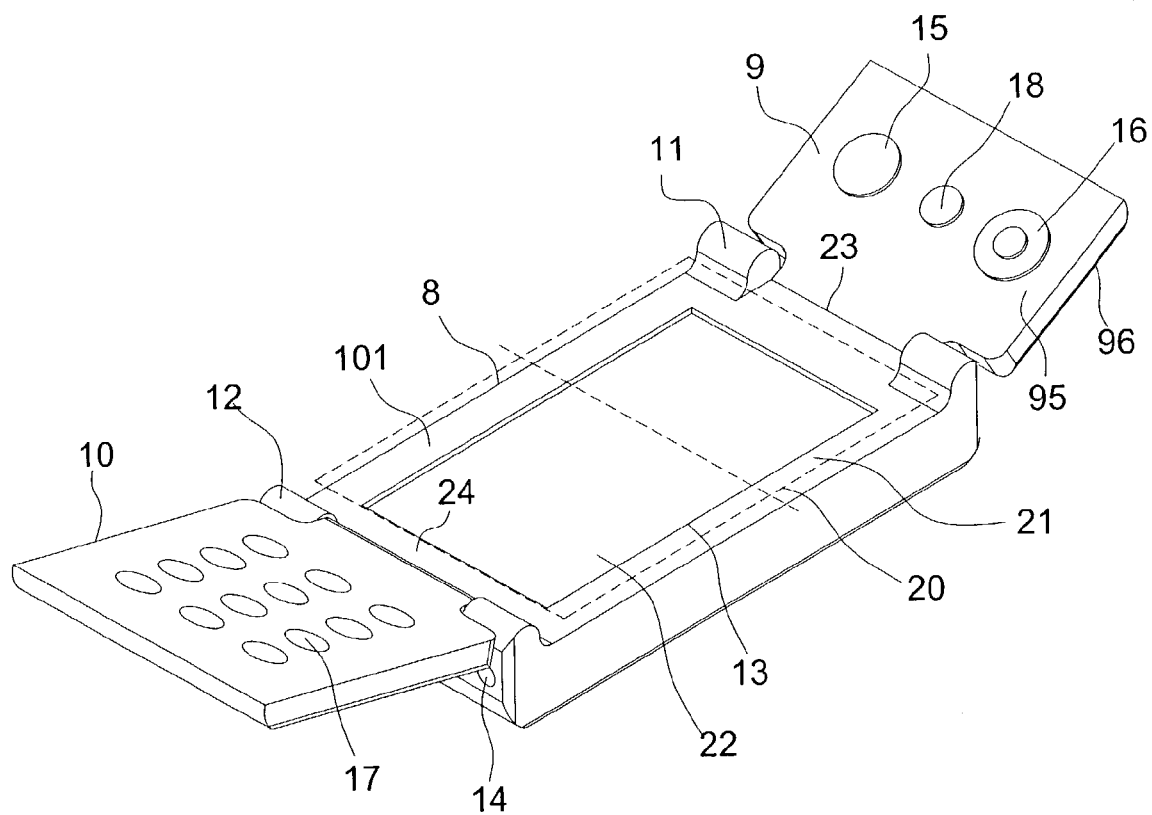
FIG. 2(a) shows an exemplary embodiment of the present invention.

Refer to FIGS. 2(a), (b), and (c). FIGS. 2(a), (b), and (c) show the first exemplary embodiment of the present invention. As shown in FIG. 2(a), the exemplary portable communication apparatus includes a body 8, a first portion 9, and a second portion 10. Body 8 has a first end 23 and a second end 24. First portion 9 pivotally connects to first end 23 by a first hinge 11. Second portion 10 pivotally connects to second end 24 by a second hinge 12. Body 8 includes a surface 20. Surface 20 includes a first section 21 and a second section 22. Body 8 has a display apparatus 13 and a microphone 14. First portion 9 includes a first side surface 95, a second side surface 96, a receiver 15, a speaker 18, and a CCD 16. CCD 16 is provided for implementing a video camera, a scanner, or the like. In the exemplary embodiment, CCD 16 is disposed in first side surface 95 of body 8. Second portion 10 has keypads 17.

Figure 2B:
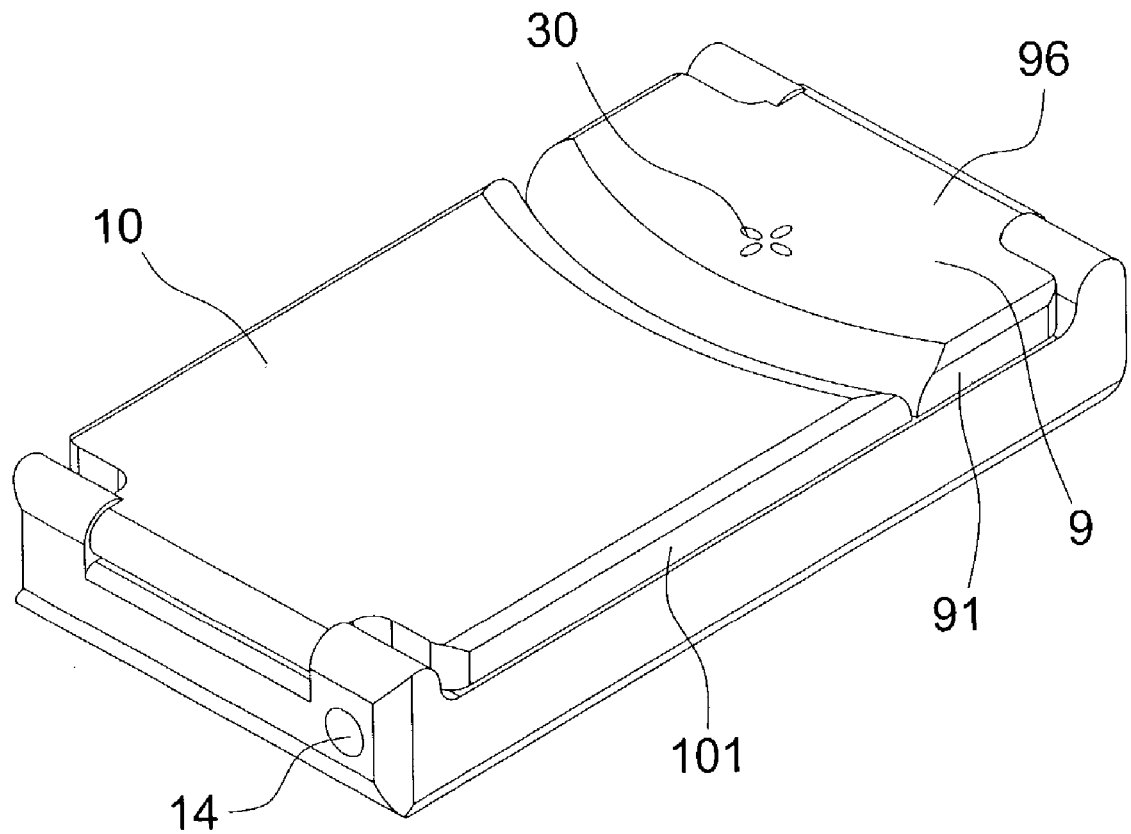
FIG. 2(b) shows a perspective view of the exemplary embodiment of the present invention, wherein a first portion of the exemplary embodiment is in a first position and a second portion is in a second position.
Figure 2C:
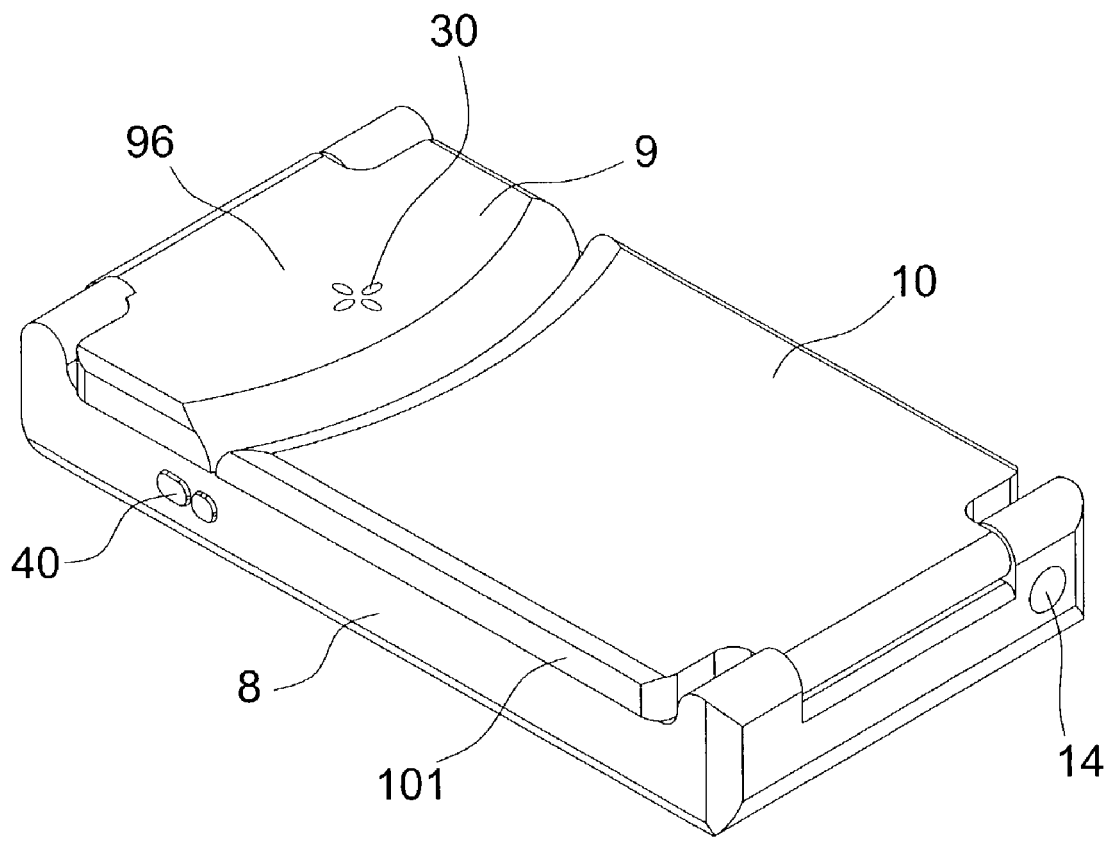
FIG. 2(c) shows another perspective view of the exemplary embodiment of the present invention, wherein a first portion of the exemplary embodiment is in a first position and a second portion is in a second position.

FIG. 2(b) shows first portion 9 covers first section 21 while first portion 9 is in first position 91 Second portion 10 covers second section 22 while second portion 10 is in second position 101. In the exemplary embodiment, second side surface 96 of first portion 9 has an audio output 30 for answering a telephone without opening the first portion 9. FIG. 2(c) discloses another side view of the exemplary embodiment. In the exemplary embodiment, body 8 further includes an input apparatus 40 such as a keypad for making a phone call.

In the exemplary embodiment, second side surface 96 of first portion 9 further includes a second display apparatus (not shown in FIG. 2) for displaying the states of the communication apparatus without opening first portion 9 and second portion 10. In addition, the CCD is also disposed in second side surface 96 of first portion 9. When opening first portion 9 for answering a phone, a user may use the CCD to capture the background image and may send the background image to the other party of phone conversation.

In the exemplary embodiment, first hinge 11, pivotally connecting first portion 9 and body 8, provides a positioning function. First hinge 11 decides the relative angle relationship between first portion 9 and body 8. Also, second hinge 12 provides a positioning function. Additionally, when an external force is exerted on first portion 9, first portion 9 rotates relative to body 8; the angle of rotation is not limited by the existence of the hinges.

Figure 3A:
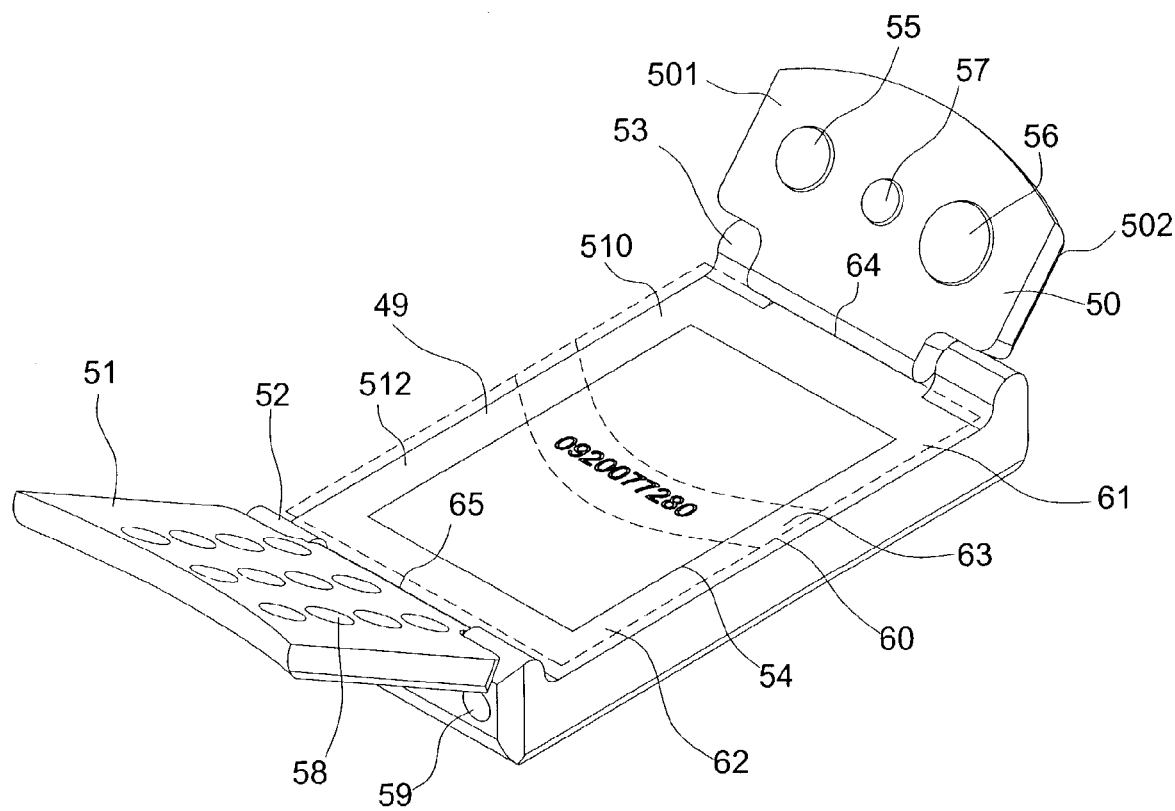
FIG. 3(a) shows another exemplary embodiment of the present invention.

Now refer to FIGS. 3(a), (b), and (c). FIGS. 3(a), (b), and (c) show the second exemplary embodiment of the present invention. Similarly, the exemplary portable communication apparatus includes a body 49, a first portion 50, and a second portion 51. Body 49 has a first end 64 and a second end 65. First portion 50 pivotally connects to first end 64 by a first hinge 53. Second portion 51 pivotally connects to second end 65 by a second hinge 52. Body 49 has a surface 60 including a first section 61, a second section 62, and a third section 63. Body 49 has a display apparatus 54 and a microphone 59. First portion 50 includes a first side surface 501, a second side surface 502, a receiver 55, a speaker 57, a first CCD 56, and a second CCD 72. First CCD 56 and second CCD 72 are provided for implementing video cameras, scanners, or the like. In this exemplary embodiment, CCD 56 is disposed in first side surface 501 and CCD 72 is disposed in second side surface 502. Second portion 51 has keypads 58.

Figure 3B:
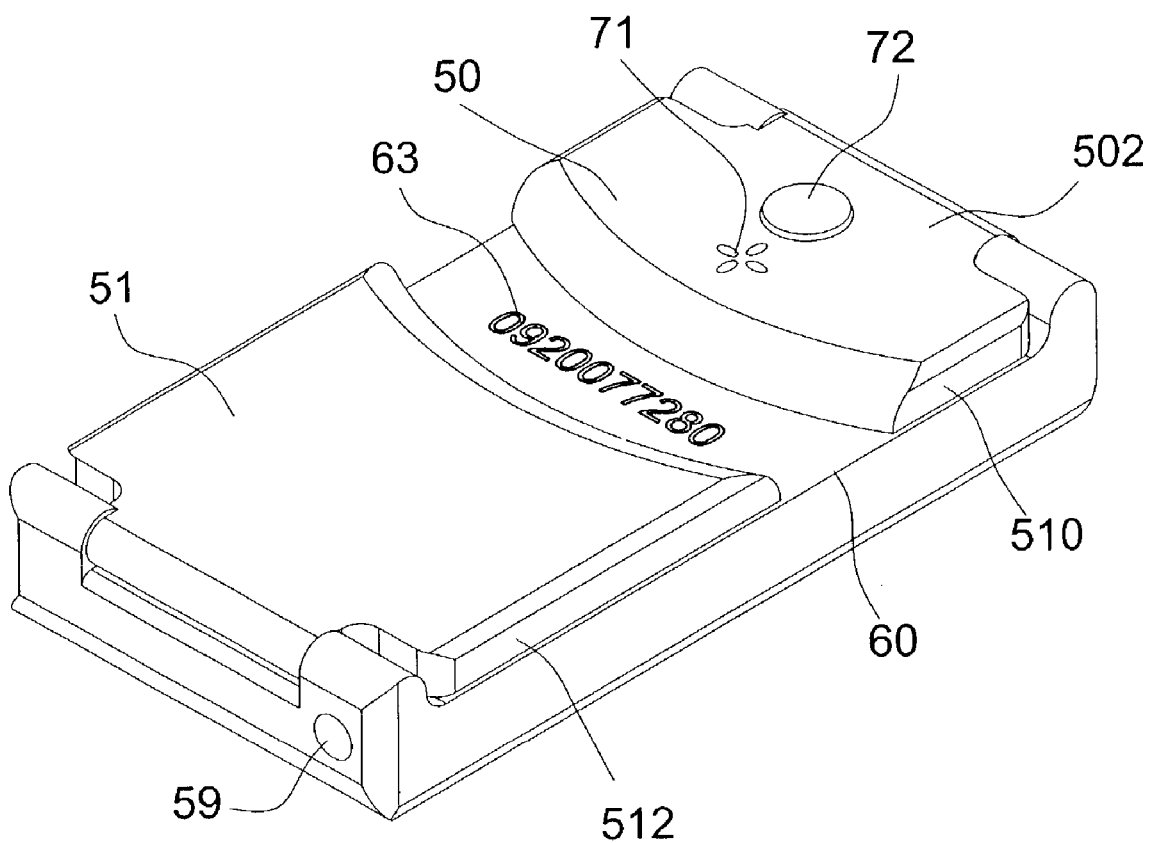
FIG. 3(b) shows a perspective view of the exemplary embodiment of the present invention, wherein a first portion of the exemplary embodiment is in a first position and a second portion is in a second position.
Figure 3C:
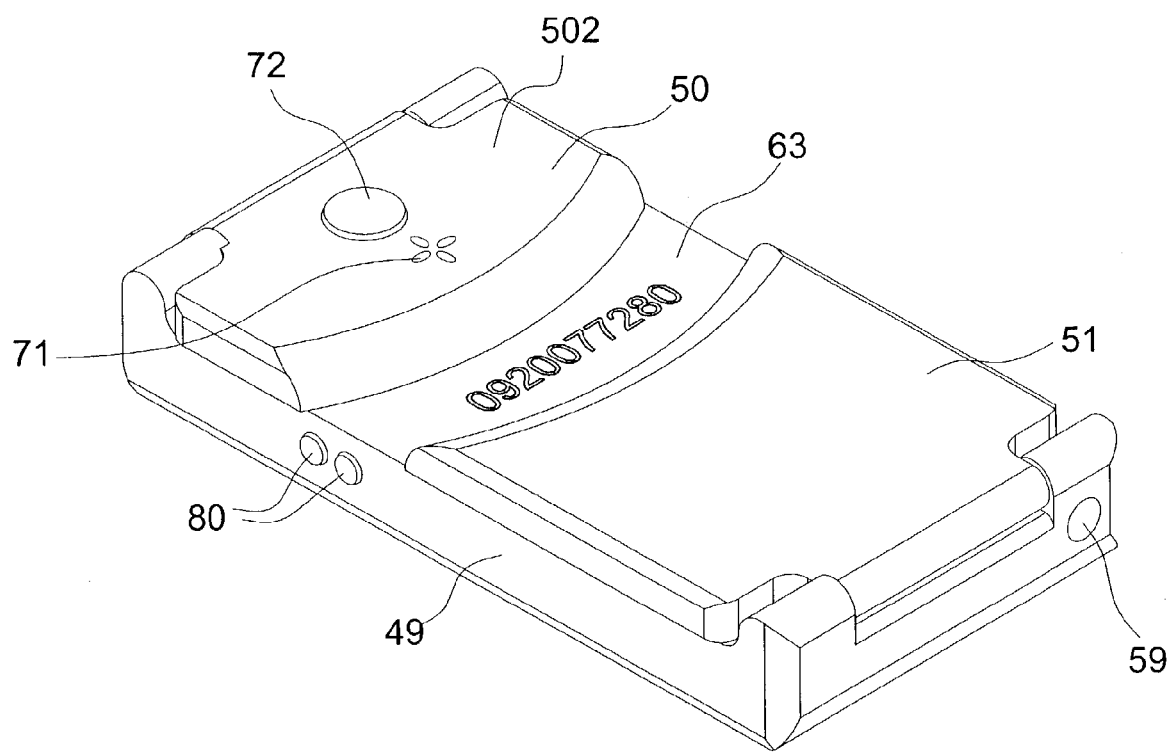
FIG. 3(c) shows another perspective view of the exemplary embodiment of the present invention, wherein a first portion of the exemplary embodiment is in a first position and a second portion is in a second position.

FIG. 3(b) shows that first portion 50 covers first section 61 while first portion 50 is in first position 510. Second portion 51 covers second section 62 while second portion 51 is in second position 512. For instance, while first portion 50 is in first position 510 and second portion 51 is in second position 512, a user may obtain the information, such as incoming calls, received signal strength, or battery power of the portable communication apparatus, via third section 63 of the display apparatus 54. In addition, first portion 50 has an audio output 71. Audio output 71 may dispose in first side surface 95 or second side surface 96 for answering a telephone without opening first portion 50. As shown in FIG. 3(c), the user may further use input apparatus 80 of body 49 to make a phone call.

Similarly, first hinge 53 decides the relative angle relationship between first portion 50 and body 49. Second hinge 52 decides the relative angle relationship between second portion 51 and body 49. Additionally, when an external force is exerted on first portion 50, first portion 50 rotates relative to the body 49, such that the angle of rotation is not limited by the existence of the hinges.

While this invention has been described with reference to an illustrative embodiment, this embodiment is not intended to be construed in a limiting sense. Various modifications of the illustrative embodiment, as well as other embodiments of the invention, will be apparent to persons skilled in the art upon reference to this description. It is therefore contemplated that the appended claims will cover any such modifications or embodiments as falling within the true scope of the invention.

We claim:

1. A portable communication apparatus, comprising:
   a body, said body having a first end, a second end, and a surface defined by said first end and said second end, wherein said surface has a first area and a second area;
   a display apparatus, said display apparatus with a maximal display size occupying said surface and said surface not having any other component thereon;
   a first portion, said first portion pivotally connecting to said first end, said first portion covering said first area while said first portion is in a first position; and
   a second portion, said second portion pivotally connecting to said second end, said second portion covering said second area while said second portion is in a second position.

2. The apparatus of claim 1, wherein said first portion pivotally connects to said first end by using a hinge.

3. The apparatus of claim 1, wherein said body has microphone positioned on a sidewall of said body.

4. The apparatus of claim 1, said surface further having a third area, wherein said third area reveals a portion of said display apparatus while said first portion is in said first position and said second portion is in said second position.

5. The apparatus of claim 4, wherein said third area reveals said portion of said display apparatus for displaying a signal.

6. The apparatus of claim 5, wherein said signal represents an incoming telephone number of said communication apparatus.

7. The apparatus of claim 5, wherein said signal represents strength of a receiving signal of said communication apparatus.

8. The apparatus of claim 5, wherein said signal represents a battery power of said communication apparatus.

9. The apparatus of claim 1, wherein said second portion has a plurality of keypads.

10. The apparatus of claim 1, wherein said first portion has a first side and a second side opposite to said first side, said first side facing to said surface when said first portion is in said first position.

11. The apparatus of claim 10, wherein said second side comprises a CCD (charge couple device).

12. The apparatus of claim 10, wherein said second side comprises a second display apparatus.

13. The apparatus of claim 10, wherein said first portion has a receiver positioned on said first side.

14. A portable communication apparatus, comprising a body and a first portion pivotally connecting to a first end of said body, said body having a display apparatus positioned on a surface defined by said first end and a second end of said body, characterized in that said display apparatus with a maximal display size occupying said surface; said surface not having any other components thereon; said first portion covers a part of a display area of said display apparatus when said first portion covers said body; and an uncovered part of said display area is an information display area of said display apparatus.

15. The apparatus of claim 14, wherein said information represents an incoming telephone number of said communication apparatus.

16. The apparatus of claim 14, wherein said information represents strength of a receiving signal of said communication apparatus.

17. The apparatus of claim 14, wherein said information represents a battery power of said communication apparatus.

18. The apparatus of claim 14, wherein said first portion has a plurality of keypads.

19. The apparatus of claim 14, wherein said communication apparatus further comprises a second portion pivotally connecting to said body.

20. The apparatus of claim 19, wherein:
   said first portion comprises a first side and a second side opposite to said first side, and said first side faces said surface when said first portion covers said body;
   said first portion comprises a receiver positioned on said first side; and
   said body comprises a microphone positioned on a sidewall of said body.

21. The apparatus of claim 20, wherein said second side comprises a CCD (charge couple device).

* * * * *